Oct. 1, 1968    N. FROST    3,404,052
METHOD OF FORMING A BEAD ON A CLUTCH BAG
Filed March 16, 1965    2 Sheets-Sheet 1
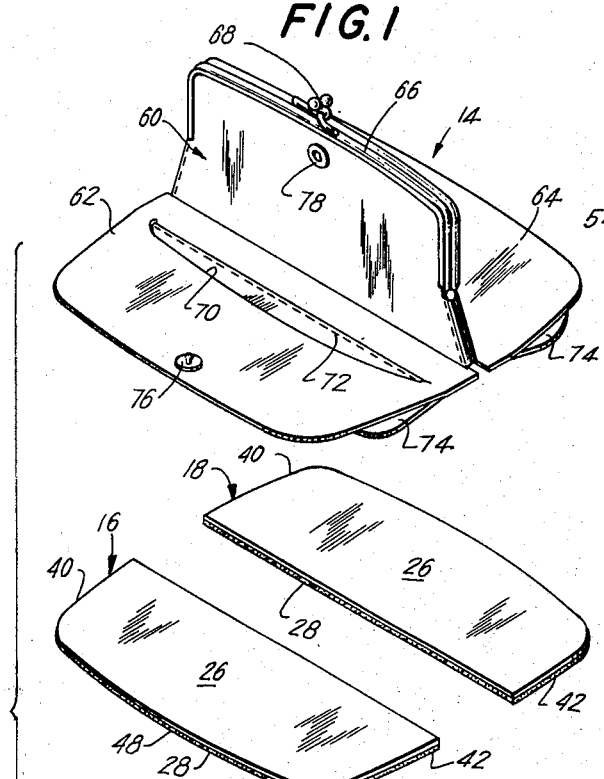
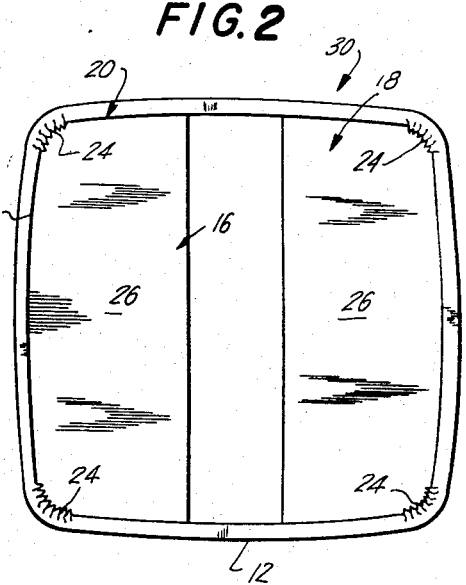
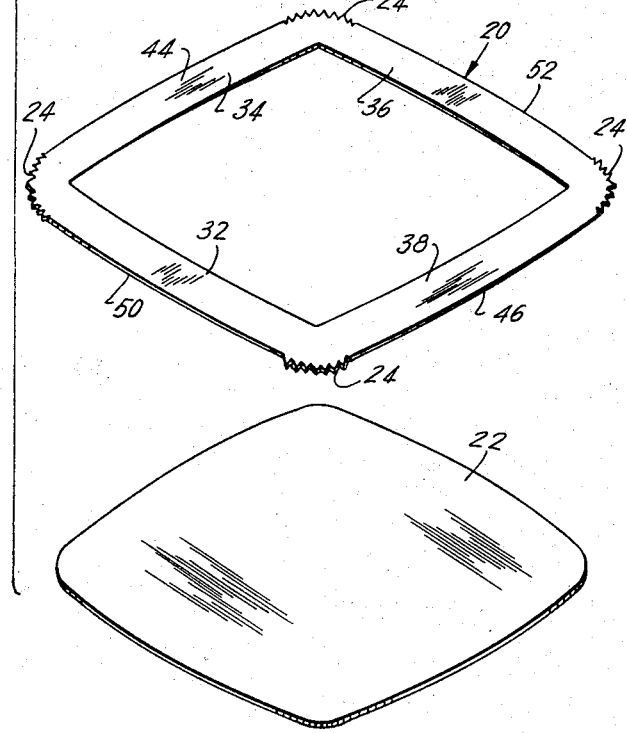
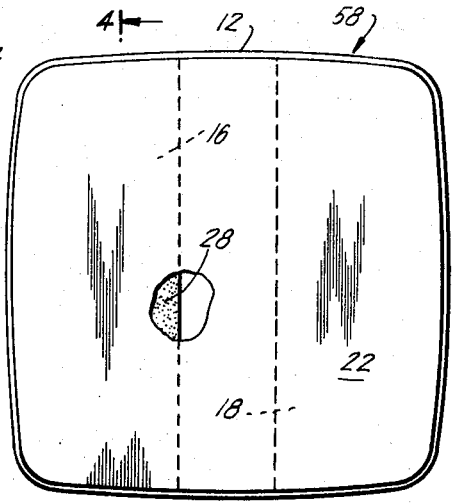
INVENTOR.
NORBET FROST
BY
Friedman & Goodman
ATTORNEYS Oct. 1, 1968   N. FROST   3,404,052
METHOD OF FORMING A BEAD ON A CLUTCH BAG
Filed March 16, 1965   2 Sheets-Sheet 2

INVENTOR.
NORBET FROST
BY Friedman & Goodman
ATTORNEYS

United States Patent Office 3,404,052
Patented Oct. 1, 1968

3,404,052
METHOD OF FORMING A BEAD ON A CLUTCH BAG
Norbet Frost, New York, N.Y., assignor to Adam-Steven Leather Goods Inc., a corporation of New York
Filed Mar. 16, 1965, Ser. No. 440,128
4 Claims. (Cl. 156—91)

ABSTRACT OF THE DISCLOSURE

A method of forming a bead on a clutch bag comprising the steps of providing a clutch bag body assembly having a purse provided with a pair of inner wall bag members, providing an outer wall member having a continuous bead provided on a surface thereof, and securing the outer wall surface to opposing surfaces of the inner wall members.

---

The present invention relates in general to a clutch bag or a clutch purse and in particular to a method for forming a peripheral bead thereon.

It is an object of the present invention to provide a simple and inexpensive means for forming a peripheral bead on a lady's clutch bag or clutch purse or the like.

It is another object of the present invention to provide a method for forming a peripheral bead on a lady's clutch bag or clutch purse which utilizes simply formed and inexpensive parts.

Other and further objects and advantages of the present invention will become readily apparent to one skilled in the art from a consideration of the following specifications taken in connection with the appended drawings.

In the drawings, which illustrate the best mode presently contemplated for carrying out the invention:

FIGURE 1 is an exploded view of a clutch bag provided with a bead pursuant to the method of the present invention;

FIGURE 2 is a plan view of a bead forming unit pursuant to the present invention;

FIGURE 3 is a plan view of the bead forming unit illustrated in FIGURE 2 assembled with the outer wall member of the purse;

Figure 5:
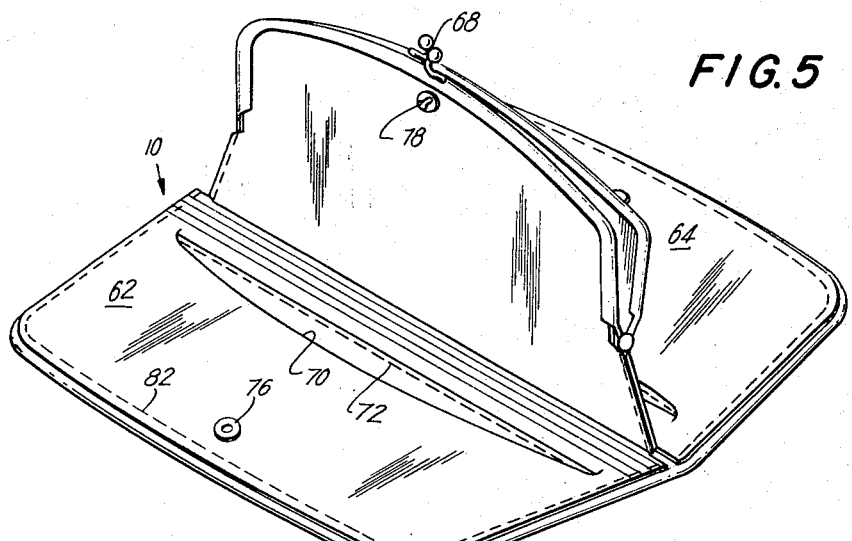
FIGURE 5 is a perspective view of the completed clutch bag, the latter being shown in its open condition and a portion being broken away for purposes of illustration.
Figure 6:
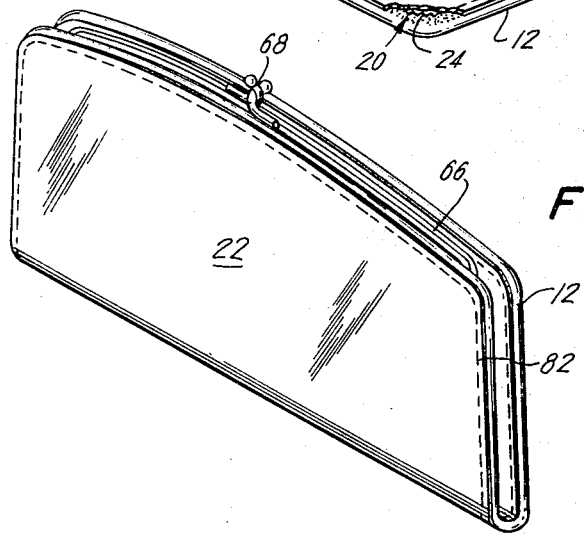
FIGURE 6 is a perspective view of the completed clutch purse with the latter being shown in its closed condition.

Referring now to the drawings in detail, there is illustrated in FIGURES 5 and 6 a clutch bag or clutch purse 10 which is provided with a peripheral bead 12 which is formed or assembled in the purse 10 pursuant to the present invention. The various parts which form the bag 10 are illustrated in FIGURE 1. As here shown, these parts comprise a clutch bag body assembly 14, a pair of identical panels 16 and 18, a bead forming frame member 20 and an outer wall bag member 22.

The bead forming frame member 20 is formed of any suitable bag making material, such as, for example and not by way of limitation, leather, a suitable fabric sheet material or a suitable plastic sheet material. The frame member 20 is provided with four pinked corners 24 so as to facilitate the bending or folding thereof as hereinafter described in detail. The frame member 20 mounts the pair of panels 16 and 18. Each of the panels is constituted by a relatively rigid backing member 26, preferably formed of cardboard or other similar material, to one face of which there is secured a resilient sheet 28 preferably formed of plastic sponge material or sponge rubber or other similar material. The panels 16 and 18 are assembled with the bead forming frame member 20 to form the bead forming unit 30 illustrated in FIGURE 2. In forming the bead forming unit 30, the panels 16 and 18 are positioned on the frame member 20 to overlie the latter, as shown in FIGURE 1. More specifically, it will be noted that the frame member 20 is provided with the four integral arms 32, 34, 36 and 38. Furthermore, it will be understood that the longitudinal dimensions of each of the four arms exceeds the longitudinal dimensions of each of the panels. Consequently, it will be understood that the panel 16 when positioned on the arm 32 will be disposed so that the marginal end edges 40 and 42 thereof are positioned inwardly of the outer marginal edges 44 and 46 of the arms 34 and 38, respectively. Similarly, it will be understood that the outer longitudinal marginal edge 48 of the panel 16 is disposed inwardly of the outer longitudinal marginal edge 50 of the arm 32. Similarly, the panel 28 may be disposed to overlie the arm 36, so that the marginal edge 40 thereof is disposed inwardly of the marginal edge 44 of the arm 34 and the marginal edge 42 thereof is disposed inwardly of the marginal edge 46 of the arm 38. Also, it will be understood that the longitudinal marginal edge 48 of the panel 18 is disposed inwardly of the longitudinal outer marginal edge 52 of the arm 36. Consequently, with the panels so disposed on the frame member 20 it will be apparent that there is a continuous peripheral frame portion 54 (FIGURE 2) which extends outwardly of the adjacent outer marginal edges of the panels 16 and 18. The panels are suitably secured to the frame member 20, in the described disposition thereof, preferably by a suitable cement or adhesive and the continuous peripheral frame portion 54 is then folded back to overlie the panels as shown in FIGURE 2 and is secured thereto in overlying relation, the pinked corners 24 facilitating the bending of the four arms of the frame member 20 so that the continuous portion 54 overlies and is secured to the underlying surfaces of the panels 16 and 18. With the frame 20 folded over the panels 16 and 18 the periphery of the bead forming unit 20 defines a continuous bead 12. In the position of the bead forming unit 30 illustrated in FIGURE 2, it will be understood that the backing members 26—26 of the cooperating panels 16 and 18 are uppermost, the pinked corners 24 being superimposed on said backing members.

The previously referred to outer wall bag member 22 is formed of a suitable bag making material such as, for example and not by way of limitation, a suitable plastic material, fabric material, or leather. The outer wall bag member 22 is complementary in conformation to the bead forming unit 30 and it will be understood that both the longitudinal and widthwise dimensions of the wall member 22 are less than the similar dimensions of the bead forming unit 30. The wall member 22 is assembled with the bead forming unit 30 to provide the outer wall and bead assembly 58 illustrated in FIGURE 3. More specifically, the outer wall member 22 is superimposed on the bead forming unit 30 so as to overlie and be secured to the resilient portions or members 28 of the respective panels 16 and 18. Moreover, due to the fact that the dimensions of the outer wall bag member 22 are smaller than the dimensions of the bead forming unit 30 it will be noted, as shown in FIGURE 3, that the continuous bead 12 projects beyond the marginal edges of the wall member 22 when the latter is secured to the bead forming unit 30. It will be understood that said securement may be affected by any suitable means such as, for example and not by way of limitation, by the utilization of a suitable cement or a suitable adhesive.

Figure 4:
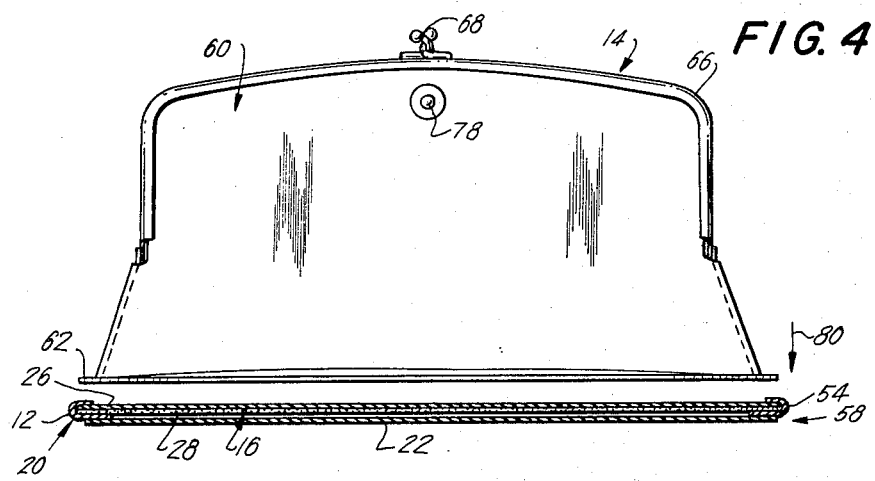
FIGURE 4 is a view partially in elevation and partially in section and illustrates the assembly of the purse blank with the assembled bead forming unit and outer wall member illustrated in FIGURE 3.

The next step in the process of the present invention involves the securement of the outer wall and bead assembly 58 to the clutch bag body assembly 14, as best shown in FIGURE 4. As here shown, the clutch bag assembly 14 is of conventional construction and comprises a purse 60 provided with a pair of inner wall bag members 62 and 64. The purse 60 is provided with a conventional purse frame 66 having a snap lock 68. Each of the inner wall bag members is provided with a slit 70 and a pair of conventional pocket forming flaps 72 and 74. Provision is also made on each of the inner wall members for a snap fastener element 76 which cooperates with a complementary snap fastener element 78 provided on the purse 60.

The final assembly operation of the present invention requires the assembly of the inner wall members 62 and 64 to the outer wall and the assembly 58, illustrated in FIGURE 3. For this purpose, the outer wall and bead assembly 58 is disposed, as shown in FIGURE 4, with the outer wall bag member 22 lowermost and the inner wall members 62 and 64 are superimposed upon the latter, as shown in FIGURE 4, and moved into engagement with the assembly 58, as indicated by the arrow 80. The inner walls 62 and 64 may be secured to the outer wall and bead assembly in any suitable manner, such as, for example and not by way of limitation, by means of a suitable cement or adhesive or by means of thermal bonding or as here shown by a line of stitching 82. It will be understood that the combined dimensions of the inner walls 62 and 64, for example, in the disposition thereof shown in FIGURE 1, are less than the dimensions of the outer wall and bead assembly 58, so that, when the inner wall members are secured to the outer wall and bead assembly, the continuous bead 12 projects beyond the outer marginal edges of the inner wall members as best shown in FIGURE 5.

It will be noted that pursuant to the present invention there is provided a highly novel method for forming a continuous bead on a clutch bag or clutch purse, so as to provide an unusually attractive clutch bag as shown in FIGURE 6. It will be understood that various changes and modifications may be made in the method of the present invention without, however, departing from the basic inventive concept thereof as set forth in the appended claims.

I claim:
1. The method of forming a bead on a clutch bag assembly having a purse from which there extends a pair of inner wall bag members comprising, providing an outer wall member, providing a frame member, securing a pair of laterally spaced panels to one surface of said frame member to define a continuous peripheral portion of said frame member which extends beyond said panels, folding said peripheral portion over said panels and securing said panels thereto to define a continuous peripheral bead, securing one surface of said outer wall member to the other surface of said frame member, and securing said bead to confronting surfaces of said inner wall bag members.

2. The method as in claim 1, wherein the outer surfaces of said inner wall bag members are superimposed on the inner surface of said outer wall member and secured thereto.

3. The method as in claim 1, wherein the outer surfaces of said inner wall bag members are superimposed on the inner surface of said outer wall member and stitched thereto.

4. The method as in claim 1, wherein said panels are provided with backing members having resilient facing elements and said facing elements are secured to said one surface of said outer wall member.

References Cited
UNITED STATES PATENTS

| | | | |
|---|---|---|---|
| 1,641,871 | 9/1927 | Solomon | 150—1.6 |
| 1,790,497 | 1/1931 | Brady | 150—28 X |
| 1,984,122 | 12/1934 | Felmann | 150—32 |
| 2,346,434 | 4/1944 | Herbener | 150—38 X |
| 3,330,322 | 7/1967 | Frost | 150—29 |
| 1,830,372 | 11/1931 | Rhodes | 150—28 |
| 1,831,016 | 11/1931 | L'Enfant | 150—28 |
| 2,062,646 | 12/1936 | Fox | 29—509 |
| 2,093,083 | 9/1937 | Klau | 161—44 |

EARL M. BERGERT, *Primary Examiner.*

R. A. KILLWORTH, *Assistant Examiner.*